United States Patent [19]
Poeschl

[11] 3,840,316
[45] Oct. 8, 1974

[54] TWO BELT MOLD FOR SHAPING PLURAL ARTICLES

[75] Inventor: George J. Poeschl, Minneapolis, Minn.

[73] Assignee: Honeywell Inc., Minneapolis, Minn.

[22] Filed: Mar. 19, 1973

[21] Appl. No.: 342,643

Related U.S. Application Data

[63] Continuation of Ser. No. 126,208, March 19, 1971, abandoned.

[52] U.S. Cl............ 425/447, 425/223, 425/440, 425/451, 425/DIG. 44, 264/313, 164/129, 164/330
[51] Int. Cl............ B29c 5/00, B22d 33/04
[58] Field of Search .......... 425/186, 223, 261, 350, 425/371, 440, 451, DIG. 44, 447; 164/131, 329–331, 129; 264/297, 313

[56] References Cited
UNITED STATES PATENTS

| | | | |
|---|---|---|---|
| 1,615,696 | 1/1927 | Gutierrez | 164/330 |
| 1,751,430 | 3/1930 | Thomson | 425/DIG. 44 |
| 2,458,410 | 1/1949 | Parsons | 164/330 X |
| 2,533,335 | 12/1950 | Wallace | 425/451 X |
| 2,817,875 | 12/1957 | Harris | 425/DIG. 44 |
| 2,865,047 | 12/1958 | Mason | 425/DIG. 44 |
| 3,035,302 | 5/1962 | Lysobey | 425/371 |
| 3,066,351 | 12/1962 | Schriner | 425/DIG. 44 |

FOREIGN PATENTS OR APPLICATIONS 941,543  11/1963  Great Britain ..................... 164/330

*Primary Examiner*—R. Spencer Annear
*Attorney, Agent, or Firm*—Charles J. Ungemach; Albin Medved; John S. Munday

[57] ABSTRACT

A method and apparatus for continuous part casting in which two moving continuous belts are provided each with a series of partial molds which are capable of alignment with the partial molds on the other belt to form complete part molds. The belts are engaged together, and the part molds defined, by the passage of the belts through idler wheels. Molten material is then poured into the part molds and allowed to cool. Passage of each belt over a separate idler wheel accomplishes belt separation and the removal of the parts.

1 Claim, 7 Drawing Figures

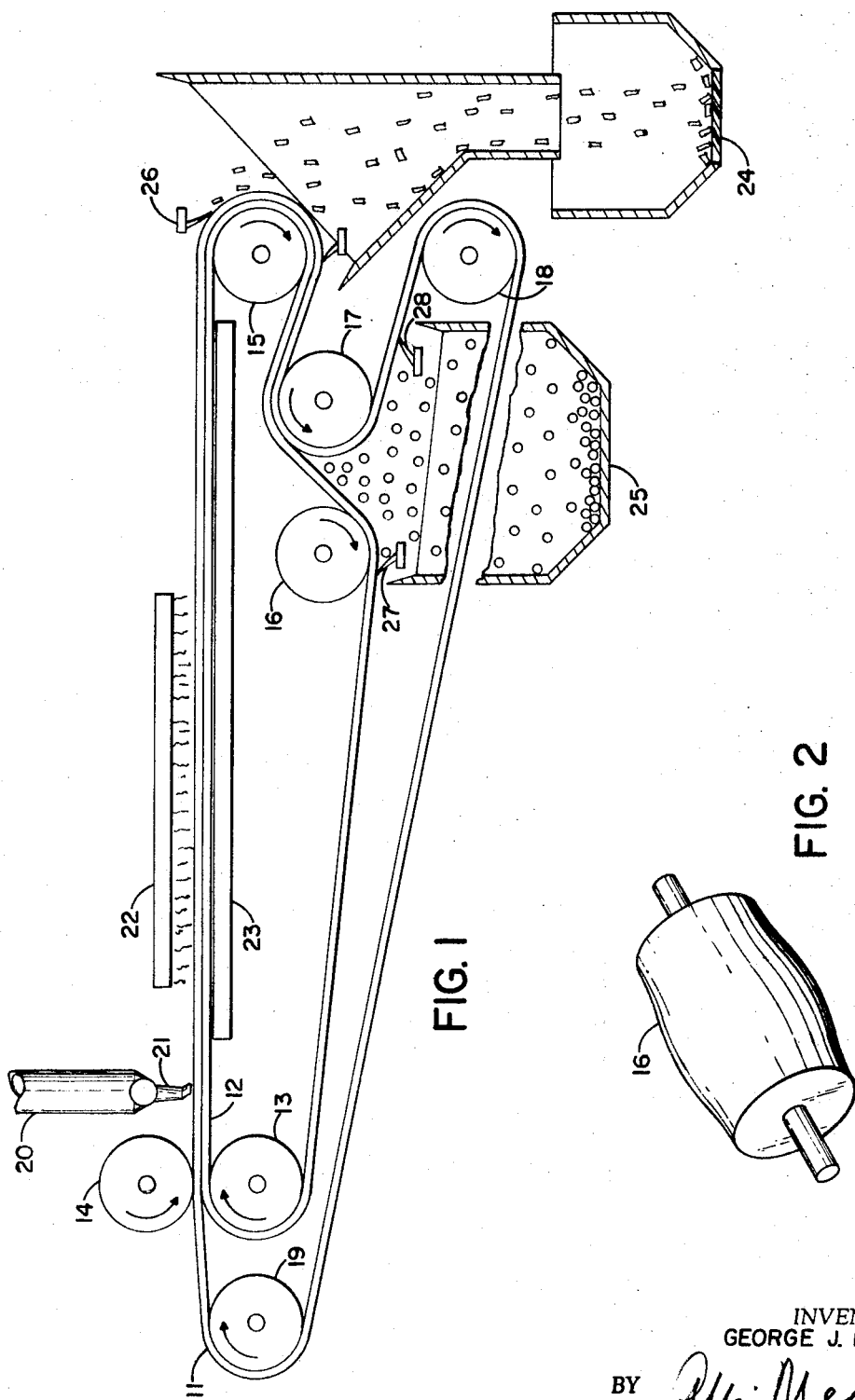

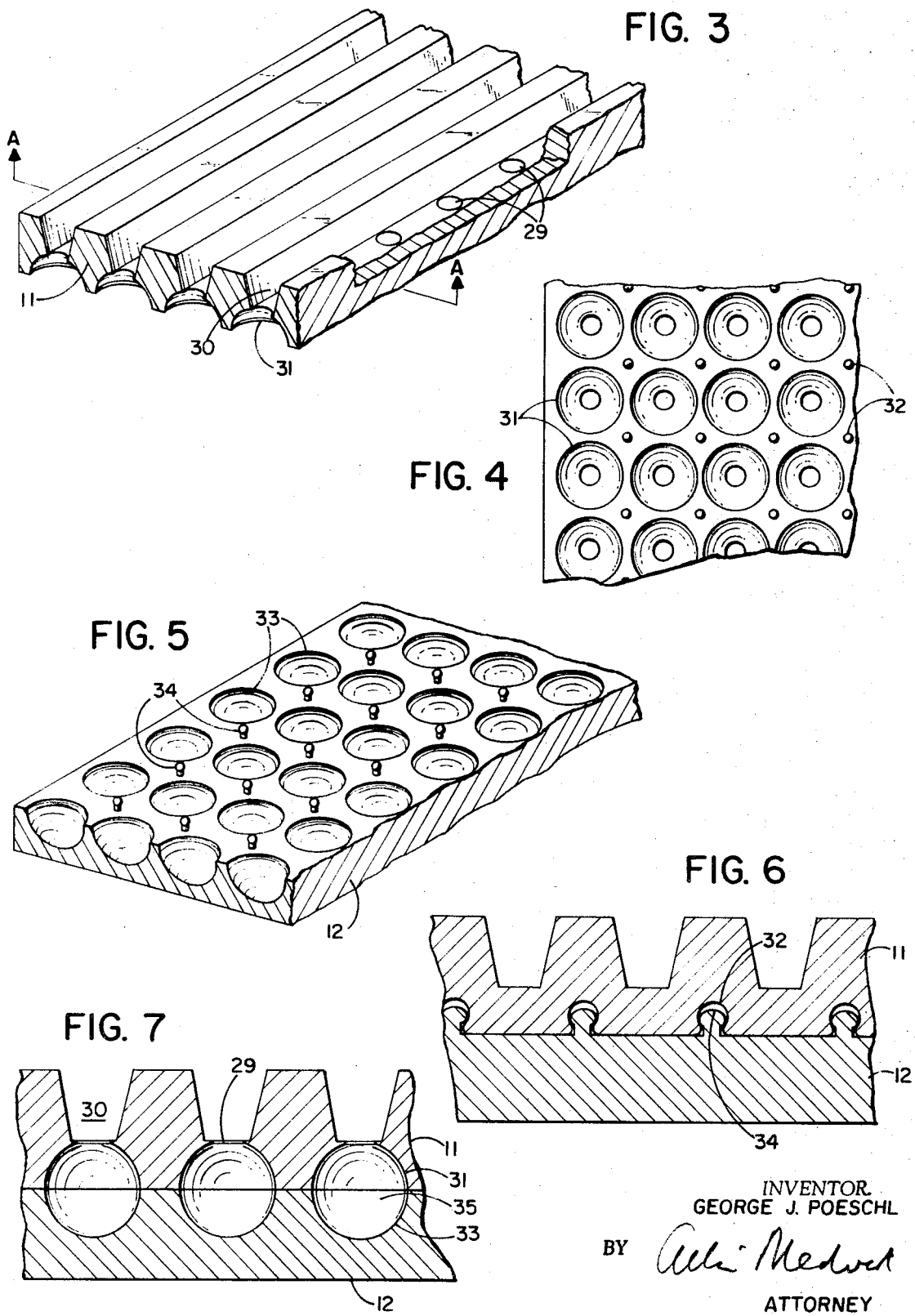

TWO BELT MOLD FOR SHAPING PLURAL ARTICLES

This is a continuation of application Ser. No. 126,208, filed Mar. 19, 1971, now abandoned.

BACKGROUND OF THE INVENTION

1. Field of the Invention

This invention relates generally to apparatus and methods for casting articles and more specifically to the use of conveyor belts in a casting operation.

2. Description of the Prior Art

The casting of piece parts in mass production is currently accomplished by the utilization of large mold plates. Molten material is poured into the mold and the entire mold plate is then opened and the parts removed.

It is an object of the present invention to provide a simple, reliable, and inexpensive apparatus and method to rapidly and continually fabricate casted parts.

BRIEF SUMMARY OF THE INVENTION

In accordance with the invention, an apparatus and method for continually fabricating casted parts is provided. Two moving continuous belts are provided each with a plurality of partial molds on one belt face. The partial molds on one belt align with the partial molds on the second belt to define complete part molds when the belts are brought face to face. One belt has engagement dowels and the other has engagement sockets, both located on the same face as the partial molds. The belts are brought face to face, engagement of dowels and sockets accomplished, and the complete part molds formed by the passage of the belts between two idler wheels. Molten material is then poured into the part mold, cooled, and formed into a solid part. The passage of each belt over a separate idler wheel accomplishes the separation of the two belts and the removal of the part.

Various other objects, advantages and features of novelty which characterize my invention are pointed out with particularity in the claims annexed hereto and forming a part hereof. However, for a better understanding of the invention, its advantages and objects obtained by its use, reference should be had to the drawings which form a further part hereof and to the accompanying descriptive matter, in which there is illustrated and described a preferred embodiment of the invention.

BRIEF DESCRIPTION OF THE DRAWINGS

In the drawings, FIG. 1 shows a preferred embodiment of the present invention;

FIG. 2 shows a crowned idler wheel;

FIG. 3 shows the top face of the upper mold belt;

FIG. 4 shows the bottom face of the upper mold belt;

FIG. 5 shows the top face of the lower mold belt;

FIG. 6 shows how engagement is accomplished between the upper and lower mold belts; and FIG. 7 shows an upper and lower mold belt when engaged.

DESCRIPTION OF THE PREFERRED EMBODIMENT

Shown in FIG. 1 is the overall method and apparatus for constructing casted parts. In this drawing, upper mold belt 11 and lower mold belt 12 are shown and are as described in FIGS. 3 through 7. Also shown in this drawing is an idler wheel 13 and an idler wheel 14 which wheels cause the engagement of belts 11 and 12. Additional idler wheels 15, 16, 17, 18 and 19 are shown to motivate and guide the belts. Idler wheels 16 and 17 are crowned, as shown in FIG. 2, to facilitate the part removal. A material supplier 20 supplies molten material to a cross manifold of pouring nozzles 21. Heated plate coils 22 and cooled plate coils 23 are shown above and below the engaged mold belts. Also shown is a conveyor 24 and a side delivery chute 25. A trough material deflector 26 is shown above idler wheel 15 and belt wipers 27 and 28 are shown below idler wheels 16 and 17.

Referring to FIG. 3, the top face of upper mold belt 11 is shown. Mold belt 11 can be constructed of rubber, plastic, a combination of rubber and plastic, or any other material which is flexible or can be provided with flexible joints. A series of holes 29 are shown located in each of a series of pouring troughs 30. Each hole 29 is open to a hemispherical cavity 31. The cavity 31 is a portion of an entire mold to be formed.

Referring now to FIG. 4, a view along AA of FIG. 3 is shown. This view is the bottom face of upper belt 11. Shown is the relationship between a matrix of hemispherical cavities 31 and a matrix of sockets 32.

FIG. 5 shows the upper face of lower belt 12. A matrix of hemispherical cavities 33 are shown along with a matrix of dowels 34. The cavity 33 is the other portion of an entire mold to be formed. It is to be noted that although the mold portions are shown as hemispherical cavities, they do not have to be hemispherical or even symmetrical. In the preferred embodiment, described here, for the purposes of illustration the apparatus is designed to cast spherical objects. Clearly, however, the shape of the mold portion carried by the belts can be in the form of either a depression or a protrusion from the belt surface. The mold cavities 31 and 33 can be lined with a material which allows the easy removal of a casted part.

When the bottom face of upper mold belt 11 is brought face to face with the top face of lower mold belt 12, dowels 34 will snap into sockets 32, as shown in FIG. 6, thus engaging the belts and coupling cavity 31 with cavity 33 and forming a part mold 35 as shown in FIG. 7. Thus, at coupling, a portion of the matrix of cavities 31 in the upper belt couples with a portion of the matrix of cavities 33 of the lower belt. FIG. 7 also shows trough 30 and hole 29 leading to mold cavity 35.

In operation, upper mold belt 11 and lower mold belt 12 are passed face to face between idler wheels 13 and 14. Idler wheels 13 and 14 supply pressure to the upper and lower mold belts to cause dowels 34 to be snapped into sockets 32. When this occurs hemispherical cavities 31 and 34 begin to couple to form spherical part molds 35.

Pouring nozzles 21 pour the molten material from the material supplier 20 into the plurality of troughs 30. After this occurs, the molten material seeps through hole 12, and fills part mold 35. The heated plate coils 22 provide heat to the material within trough 30 in order to keep it in a molten state so that it can seep into part molds 35 through holes 29 as the belt moves away from nozzles 21. Cooled plate coils 23 provide cooling to the material within part molds 35 in order to solidify the part to be formed. When each individual part reaches idler wheels 16 and 17 it has been solidified.

A deflector 26 is provided for breaking the solidified trough material which was poured into trough 30 but was in excess of the amount required to fill part mold 35. This solid material is collected on a conveyor 24 and then conveyed to a remelter to be later delivered to material supplier 20.

Idler wheels 16 and 17 are provided in order to separate the upper and lower mold belts. One belt is passed over idler wheel 16 and the other over wheel 17. By separating the belts, the dowels 34 pop out of the sockets 32 and the solidified parts formed within part molds 35 are allowed to drop free. The crowning of wheels 16 and 17 bends the belts to aid the parts in dropping free. If the part should not drop out, wipers 27 and 28 are provided to supply pressure to the part in order to remove it from hemispherical cavity 31 or 33. Side delivery chute 25 then collects the finished parts.

The particular mold cavities on belts 11 and 12 are then free of material and guided toward wheels 13 and 14 for re-engagement and further part molding.

While this invention has been described in conjunction with a specific embodiment thereof, it is evident that many alternatives, modifications, and variations will be apparent to those skilled in the art in the light of the foregoing description. Accordingly, the specific embodiment is intended to embrace all such alternatives, modifications, and variations which fall within the spirit and broad scope of the appended claims.

I claim as my invention:

1. Apparatus for fabricating case parts from molds comprising:
   a first endless resilient belt having a matrix of first mold portions;
   a second resilient belt having a matrix of second mold portions, said matrix of second mold portions being complimentary to said matrix of said first mold portions to form a matrix of part molds when coupled together;
   means for continuously feeding molten material to said first endless belt, said first endless belt having passage defining means for introducing molten material into said molds;
   means for cooling said second mold portions, and means for heating said first mold portions until said molten material has solidified in said second mold portions, said means for feeding being adapted to supply molten material until said molten material has solidified in said second mold portions;
   means for driving said belts and positioning said belts to form said molds, whereby said feeding means, cooling means, and heating means are operatively connected to said completed molds; and
   means for separating said molds after solidification of said material.

* * * * *